United States Patent [19]

Miyoshi

[11] Patent Number: 5,046,040
[45] Date of Patent: Sep. 3, 1991

[54] MICROPROGRAM CONTROL APPARATUS USING DON'T CARE BITS AS PART OF ADDRESS BITS FOR COMMON INSTRUCTIONS AND GENERATING VARIABLE CONTROL BITS

[75] Inventor: Akio Miyoshi, Tokyo, Japan
[73] Assignee: Kabushiki Kaisha Toshiba, Japan
[21] Appl. No.: 947,642
[22] Filed: Dec. 30, 1986
[30] Foreign Application Priority Data
Jan. 16, 1986 [JP] Japan .................. 61-6672
[51] Int. Cl.$^5$ .................. G06F 9/26; G06F 9/32
[52] U.S. Cl. .................. 364/900; 364/949.1; 364/947.3; 364/960.2
[58] Field of Search ... 364/200 MS File, 900 MS File

[56] References Cited

U.S. PATENT DOCUMENTS

| | | | |
|---|---|---|---|
| 3,646,522 | 2/1972 | Furman et al. | 364/200 |
| 3,949,370 | 4/1976 | Reyling, Jr. et al. | 364/200 |
| 3,990,054 | 11/1976 | Perlowski | 364/200 |
| 4,027,291 | 5/1977 | Tokura et al. | 364/200 |
| 4,073,006 | 2/1978 | Tubbs | 364/200 |
| 4,075,687 | 2/1978 | Nissen et al. | 364/200 |
| 4,173,041 | 10/1979 | Dvorak et al. | 364/200 |
| 4,323,964 | 4/1982 | Gruner | 364/200 |
| 4,374,417 | 2/1983 | Bradley et al. | 364/200 |
| 4,388,682 | 6/1983 | Eldridge | 364/200 |
| 4,403,284 | 9/1983 | Sacarisen et al. | 364/200 |
| 4,415,969 | 11/1983 | Bayliss et al. | 364/200 |
| 4,432,052 | 2/1984 | McDonough et al. | 364/200 |
| 4,438,493 | 3/1984 | Cushing et al. | 364/200 |
| 4,482,953 | 11/1984 | Burke | 364/200 |
| 4,509,114 | 4/1985 | Leininger et al. | 364/200 |
| 4,556,938 | 12/1985 | Parker et al. | 364/200 |
| 4,812,972 | 3/1989 | Chastain et al. | 364/200 |
| 4,835,679 | 5/1989 | Kida et al. | 364/200 |

FOREIGN PATENT DOCUMENTS

| | | |
|---|---|---|
| 0039227 | 4/1981 | European Pat. Off. . |
| 2074776A | 4/1981 | United Kingdom . |
| 2077010A | 5/1981 | United Kingdom . |

OTHER PUBLICATIONS

Starnes, "Microcoded Microprocessor Simplifies Virtual Memory Management", Electronics, Dec. 1, 1983, pp. 147-149.
Motorola 68000 microprocessor program by Zolinowsky and Tredennick, "Design and Implementation of System Features for the MC68000", IEEE, Apr. 1979, pp. 2-9.
Stritter et al., "Microprogrammed Implemention of a Single Chip Microprocessor", IEEE, Aug. 1978, pp. 8-16.
The Mead & Conway etxt, Introduction of VLSI Systems, 1980, p. 81.
Parallelism in Hardware and Software, by H. Lorin, pp. 139-142, Prentice-Hall Inc., 1972.
"Microprogramming Techniques Using the AM 2910 Sequencer", J. R. Mick, COMPCON '78, Feb. 1978.

Primary Examiner—Thomas C. Lee
Attorney, Agent, or Firm—Banner, Birch, McKie & Beckett

[57] ABSTRACT

A microprogram control device comprises a machine instruction decoder (11) for sequentially decoding machine instructions fetched from an external computer memory and providing a microcode start address for each decoded instruction, a counter (12) connected to the decoder for generating a required number of microcode addresses, a microcode storage unit (13) comprising an address decoding area (13a) in which microcodes are designated by microcode address and a microcode memory area (13b) in which the microcodes associated with the machine instructions are stored, and a microcode register (14) for controlling the operation of circuits (25) to be controlled and for providing a control signal output (Sc) to the counter. A "don't care" function is associated with certain bit positions of microcode addresses of microsteps common to sequential machine instructions. In this manner memory chip area may be reduced without any decrease in microcomputer operating speed. Nevertheless, the embodiment may further provide for designation of branching operations via incorporation of a next microinstruction address determination circuit coupled between the machine instruction decoding circuit and the counter, the next microinstruction address determination circuit being controlled by a microcode decoding circuit coupled to the output of the microcode register.

6 Claims, 6 Drawing Sheets

FIG. 3A (CONVENTIONAL)

| MACHINE INSTRUCTION CODE | COUNTER OUTPUT | MICROCODE |
|---|---|---|
| INSTR 1 | 01000101 0000 | aaaa |
| | 01000101 0001 | bbbbb |
| | 01000101 0010 | ccccc |
| | 01000101 0011 | ddddd |
| | 01000101 0100 | eeeee |
| | 01000101 0101 | fffff |
| | 01000101 0110 | ggggg |
| | 01000101 0111 | hhhhh |
| INSTR 2 | 10000101 0000 | xxxxx |
| | 10000101 0001 | yyyyy |
| | 10000101 0010 | zzzzz |
| | 10000101 0011 | ddddd |
| | 10000101 0100 | eeeee |
| | 10000101 0101 | fffff |
| | 10000101 0110 | ggggg |
| | 10000101 0111 | hhhhh |

FIG. 3B (CONVENTIONAL)

| MACHINE INSTRUCTION CODE | COUNTER OUTPUT | MICROCODE |
|---|---|---|
| INSTR 1 | 01000101 0000 | aaaa |
| | 01000101 0001 | bbbbb |
| | 01000101 0010 | ccccc |
| | 01000101 0011 | JUMP |
| INSTR 2 | 10000101 0000 | xxxxx |
| | 10000101 0001 | yyyyy |
| | 10000101 0010 | zzzzz |
| | 10000101 0011 | ddddd |
| | 10000101 0100 | eeeee |
| | 10000101 0101 | fffff |
| | 10000101 0110 | ggggg |
| | 10000101 0111 | hhhhh |

FIG. 3C

| MICROCODE ADDRESS | MICROCODE |
|---|---|
| INSTR 1  0010010000 | aaaa |
| 0010010001 | bbbbb |
| 0010010010 | ccccc |
| 00100 1X011 | ddddd |
| 00100 1X100 | eeeee |
| 00100 1X101 | fffff |
| 00100 1X110 | ggggg |
| 00100 1X111 | hhhhh |
| INSTR 2  0010011000 | xxxxx |
| 0010011001 | yyyyy |
| 0010011010 | zzzzz |

COMMON AREA ─ 13

FIG. 4.

FIG. 5 (CONVENTIONAL)

FIG. 6.
(CONVENTIONAL)

FIG. 7.
(PRIOR ART)

MICROPROGRAM CONTROL APPARATUS USING DON'T CARE BITS AS PART OF ADDRESS BITS FOR COMMON INSTRUCTIONS AND GENERATING VARIABLE CONTROL BITS

BACKGROUND OF THE INVENTION

1. Field of the Invention

The present invention relates generally to a microprogram control device, and more particularly, to a microprogram control device used in a computer, for example, a microcomputer or microprocessor.

2. Related Art

Figure 5:
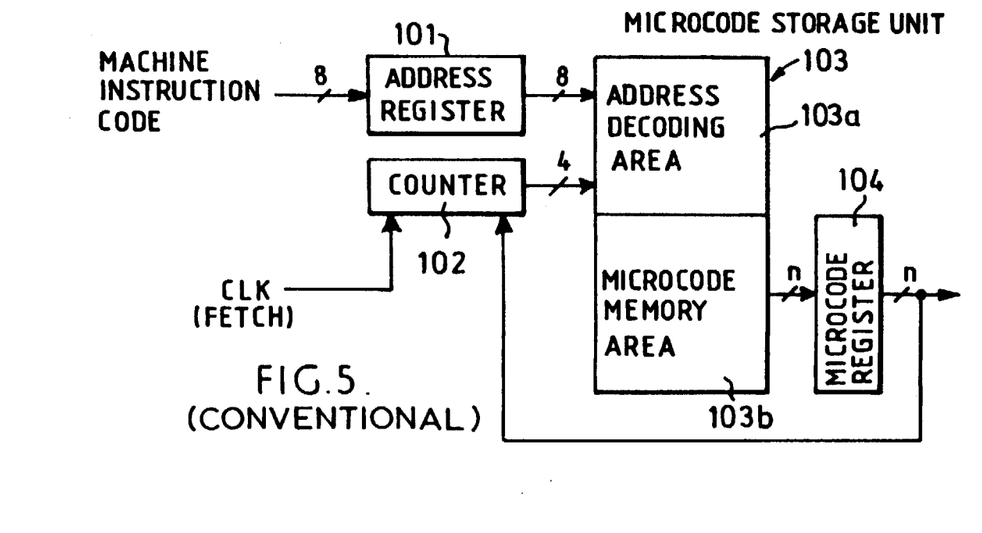
FIG. 5 is a block diagram illustrating a conventional microprogram control device.

Many microcomputers employ a microprogram control device or system. An example of a conventional microprogram control device is shown in FIG. 5. A machine instruction code from a program memory (not shown) or the like is directly input to an address register 101. This address register 101 produces an output of 8 bits, which are high-order bits of a microcode address. A counter 102, reset in synchronism with the fetch of the machine instruction code sent to the register 101, produces an output of 4 bits, which are low-order bits of the microcode address.

These two outputs constituting the microcode address are input to an address decoding area 103a, which is part of a microcode storage unit 103, and can be in the form of, for example, a PLA (programmable logic array). The address decoding area 103a of microcode storage unit 103 decodes the input microcode address, causing a microcode stored in the addressed segment of a microcode memory area 103b to be output to a microinstruction register 104. Next, the contents of the counter 102 are incremented without altering the contents of the address register 101, thus causing sequential microcode addresses to be designated.

Figure 6:
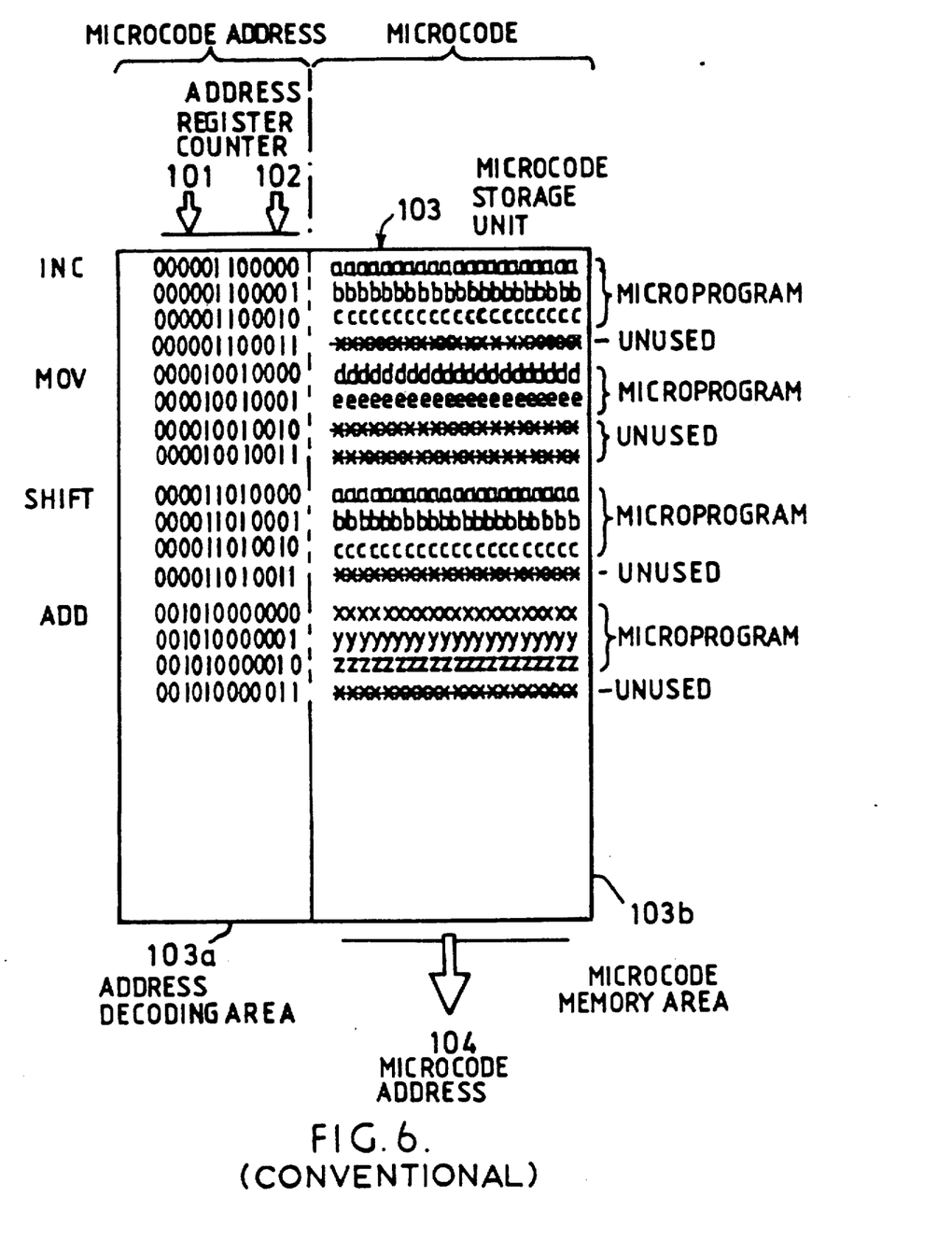
FIG. 6 is a explanatory view diagrammatically showing the operation of the conventional device shown in FIG. 5.

The conventional microcode storage unit 103 is configured as shown in FIG. 6. The address decoding area 103a has a series of microcode addresses. Each microcode address has, for example, 12 bits. Associated with each microcode address is a microcode of; for example, 21 bits, which microcode is stored within the microcode memory area 103b.

As seen from FIG. 6, with respect to four machine instructions of INC, MOV, SHIFT and ADD, a microprogram having microcodes of 2 steps are stored for machine instruction MOV, and microcodes of 3 steps are stored for machine instructions INC, SHIFT, and ADD, respectively.

More particularly, with respect to the INC instruction, the microprogram having three microcodes of "aa ... a", "bb ... b", and "cc ... c" is stored. With respect to the MOV instruction, the microprogram having two microcodes of "dd ... d" and "ee ... e" is stored. Further, with respect to the SHIFT instruction, the microprogram having three microcodes of "aa ... a", bb ... b", and "cc ... c" identical to the three microcodes of the INC instruction, is stored. In addition, with respect to the ADD instruction, the microprogram having three microcodes of "xx ... x", "yy ... y", and "zz ... z" is stored. Note that areas represented by "** ... *" are unnecessary memory areas since no microcodes for the given machine instruction microprogram need to be stored in these unused memory areas.

The above-mentioned conventional microprogram control device is required to produce a microprogram for each machine instruction. To create the low-order bits of the microcode address, counter 102 is used. Counter 102 is reset for each fetch of a machine instruction being called. By incrementing this counter, microcodes corresponding to each instruction are accessed in sequence from the start address of the microprogram being outputted. With the address decoder as employed in the above-mentioned conventional microcodes control device, the microstep is fixed to a preselected number of steps, for example, four steps. When machine instructions have microprograms with steps which are not multiples of the preselected number of steps (for example, integers of four steps), there is unused area in memory, which results in increased chip area.

Figure 7:
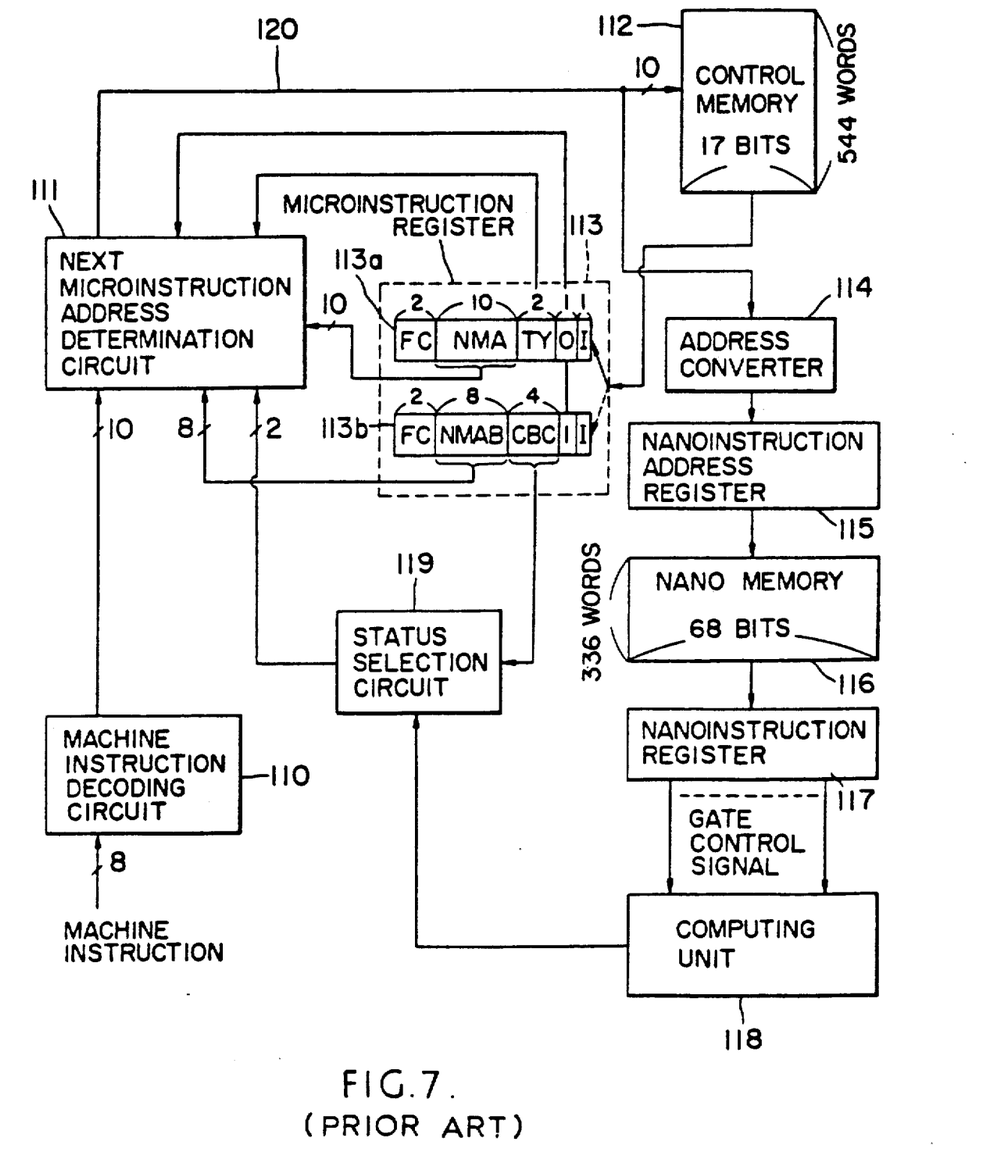
FIG. 7 is at block diagram illustrating another conventional microprogram control device.

Another example of a conventional microprogram control device will be described with reference to FIG. 7.

A machine instruction is decoded by machine instruction decoding circuit 110. Circuit 110 is typically comprised of PLA, such that microinstruction addresses from circuit 110 are input to a next microinstruction address determination circuit 111. A next microinstruction address output by circuit 111 is input to a control memory or store 112 and to an address converter 114.

Control memory 112 then outputs a microinstruction address to a microinstruction register 113. This microinstruction register 113 comprises a conditional branch instruction 113b, and another instruction 113a. To execute conditional branch instruction 113b, a control memory address, (that is, the next microinstruction address of the concerned microinstruction) is first converted into a nanoinstruction address by address converter 114. The nanoinstruction is then stored in nanoinstruction register 115.

Microinstruction 113a has an NMA (next microinstruction address) field that represents an address of the next microinstruction. When a TY field represents "00", the NMA field is output to the microinstruction address bus 120. When the TY field represents a value other than "00", the microinstruction address is determined by the output of the machine instruction decoding circuit 110. To execute conditional branch instruction 113b, status information of 2 bits selected by a CBC field is coupled to a NMAB (next microinstruction address branch) field by status selection circuit 119.

A nanoinstruction of an address stored in nanoinstruction address register 115 is output from nanomemory 116, which nanoinstruction is then stored in nanoinstruction register 117. Computing unit 118 performs predetermined computations in accordance with this nanoinstruction. Status information, for example, at carry flag, etc., produced by this computation is input to the status selection circuit 119. Status selection circuit 119 selects the status information from the computing unit 118 based on the content of the CBC field of the microinstruction 113b, and then outputs to the next microinstruction address determination circuit 111.

Therefore, in the above-mentioned conventional microprogram control device, machine instructions are converted into microinstruction addresses in the machine instruction decoding circuit 110. Microinstructions corresponding to the next microinstruction address are output from the control memory 112. Accordingly, this conventional device can deal with nanoinstructions common to different machine instructions, which results in reduced memory area. However, a control memory 112 that stores the next microinstruction address portion corresponding to the NMA field is required. In addition, extra time to determine next microinstruction addresses is required by the microcomputer. Thus, the employment of such a conventional microprogram control device results in increased chip area and lower operating speed of the microcomputer.

SUMMARY OF THE INVENTION

With the above in view, an object of the current invention is to provide a microprogram control device which improves operating speed and decreases semiconductor chip area.

Another object of the present invention is to realize a microprogram control device that has both a variable microstep function and simplified circuit construction.

According to the present invention, there is provided a microprogram control device adapted for use with a microcomputer which comprises: a decoding circuit for decoding machine instruction codes input from a program memory to the decoding circuit to create microcode start addresses for each of said machine instruction codes; a counter connected to said decoding circuit operative to count in response to the receipt of each of the microcode start addresses to produce a required number of microcode addresses; and a microcode storage unit connected to the counter comprising an address decoding area responsive to the receipt of each of said microcode addresses from the counter to produce microcodes corresponding to the microcode addresses, and a microcode memory area in which the microcodes of the microprograms defining the machine instruction codes are stored whereby when each microcode start address is input from the decoding circuit to the counter. The address decoding area sequentially designates microcodes in accordance with each microcode start address and provides an access to the microcode memory area. A predetermined microcode is read on the basis of the microcode designation of the address decoding area, and is provided for controlling circuit means.

When the microcodes of the microprograms defining different machine instructions are partially common to each other, the microprogram control device of the present invention provides a "don't care" function for a certain bit or bits of common microcode addresses of the common microcodes with a view to realizing access of the common microcodes by the different machine instructions. Thus, it becomes possible to reduce memory requirements of the microcode storage unit.

In one preferred embodiment, a next microinstruction address determination circuit is disposed between the machine instruction decoder and the counter. The determination circuit selects either a microcode start address from the machine instruction decoder or a microcode start address of the next microinstruction contained in the microcode output from the register, depending upon a control bit(s) in the microcodes provided to the counter. In this manner, the determination circuit enables designation of a branch operation as a microcode to generate various kinds of machine instructions. According to need, the counter may be provided with an area of a high-order bit assigned to a register and a remaining area assigned to the counter itself.

BRIEF DESCRIPTION OF THE DRAWINGS

FIG. 3A to 3C are explanatory views showing microcode storage conditions when microcode defining different machine instructions are partially common to each other, wherein FIGS. 3A and 3B are examples with conventional microprogram control devices, and FIG. 3C is an example with a microprogram control device according to the present invention;

DETAILED DESCRIPTION

Figure 1:
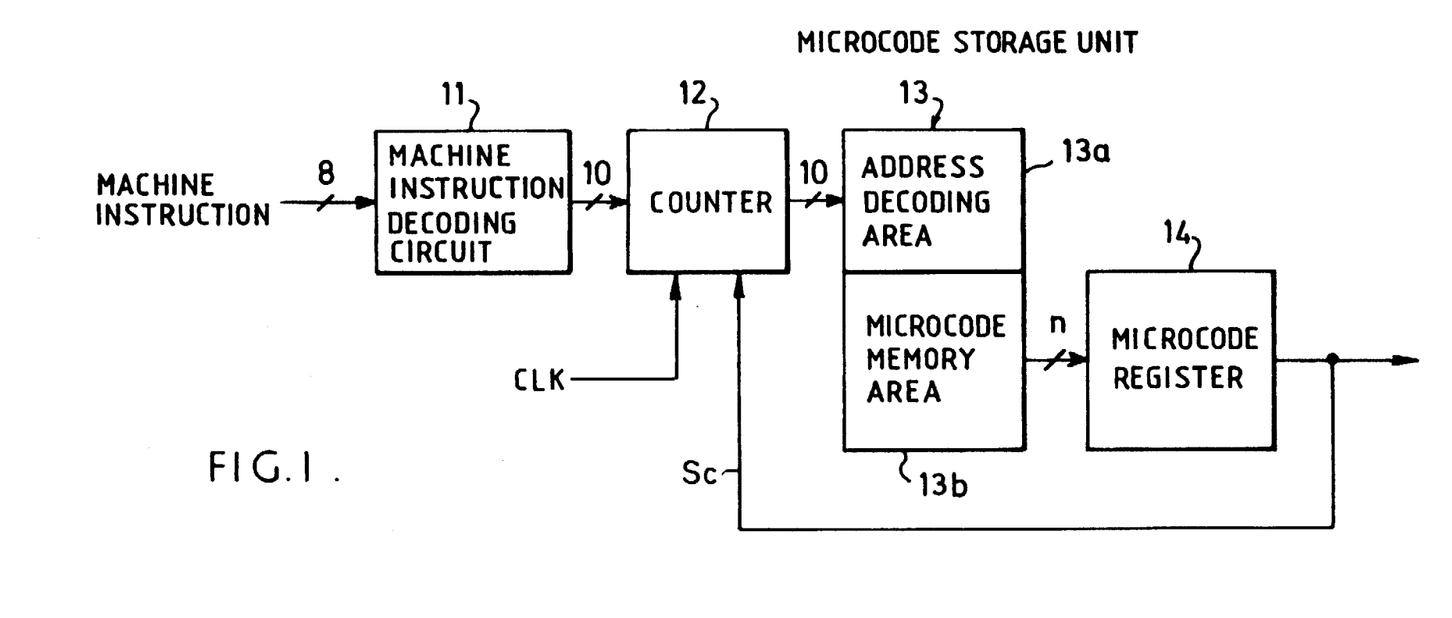
FIG. 1 is a block diagram illustrating an embodiment of a microprogram control device according to the present invention.

Referring to FIG. 1, there is shown in a block form an embodiment of a microprogram control device according to the present invention.

The microprogram control device of this embodiment comprises a machine instruction decoder 11, preferably in the form of a PLA or read only memory (ROM), that sequentially decodes machine instructions of, for example, 8 bits that are fetched from external memory (not shown) of a computer (not shown). Microcode start addresses of 10 bits per each machine instruction are generated, and a counter 12 counts up to generate the required number of microcode addresses. Incremental operation of counter 12 is synchronized by clock signal CLK. A control signal or control bit(s) Sc (to be referred to later) is input to counter 12 at this point for rendering variable microstep functions in the microprogram control device.

The microprogram control device further includes a microcode storage unit 13 of two areas 13a and 13b and is made up of, for example, PLA or ROM. Decoding area 13a of microcode storage unit 13 responds to microcode addresses from counter 12, and generates microcode addresses. Memory area 13b of microcode storage unit 33 stores the plurality of microcodes defining machine instructions in accordance with respective start addresses. When each start address is input from counter 12 to address decoding area 13a, address decoding area 13a sequentially designates to memory area 13b a microcode address per each microstep, thus predetermined microcodes of n bits are stored in microcode memory area 13b based on the address provided by address decoding area 13a.

The microcode read from microcode memory area 13b is output to a microcode register 14. Microcodes latched in the microcode register 14 are output in order to control the operation of subsequent circuits to be controlled 25. Part of the output microcode from the microcode register 14 becomes control output bit(s) Sc, and is input back to counter 12. The control output Sc controls the counter 12. Thus, counter 12 either counts up to create microcode addresses per each machine instruction, or shifts to loading the next machine instruction depending upon the logic state of the control signal Sc.

Figure 2:
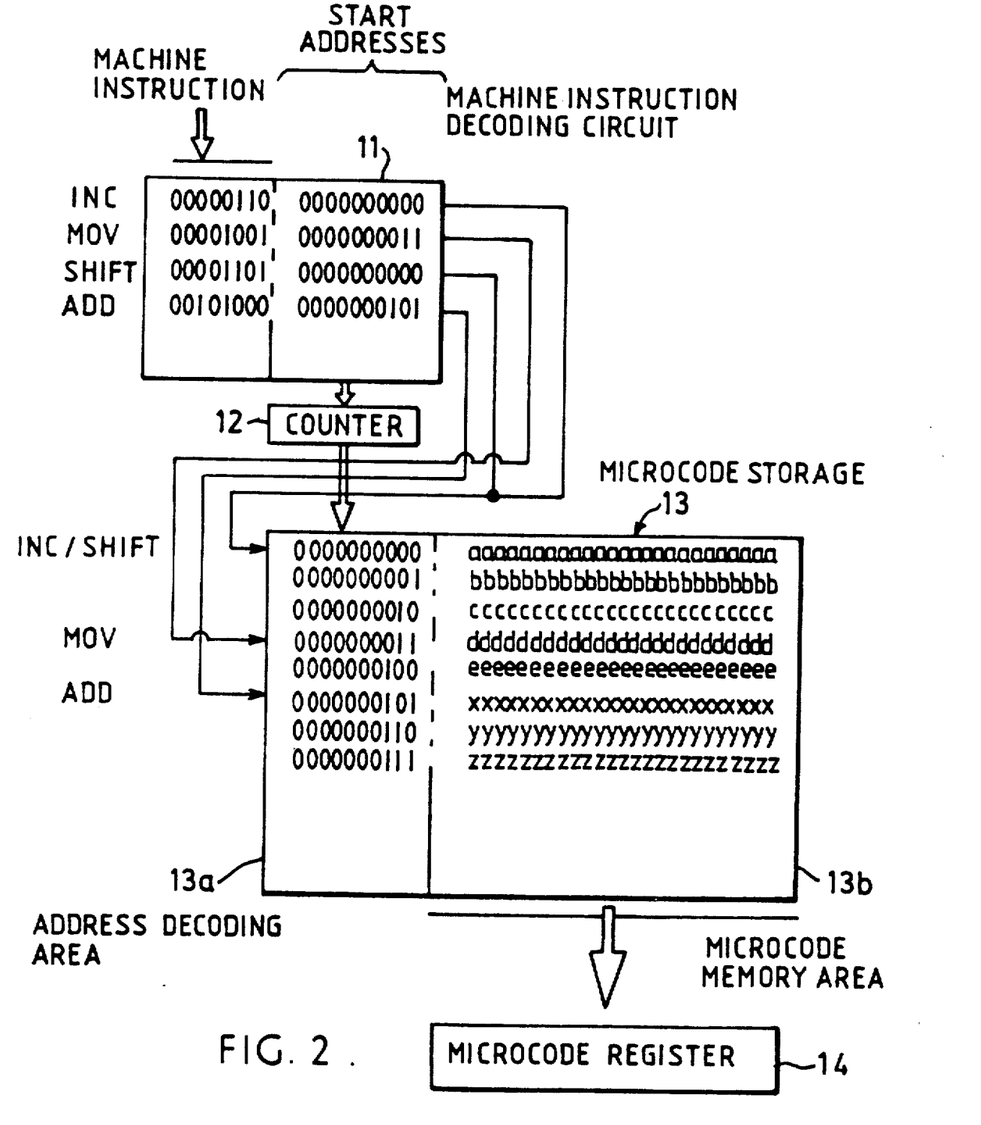
FIG. 2 is a schematic view diagrammatically showing the operation of the device of the present invention shown in FIG. 1.

Machine instruction decoding circuit 11 and the microcode storage unit 13 will now be described in detail with reference to FIG. 2.

Machine instruction decoding circuit 11 is a matrix circuit that decodes machine instruction codes and creates start addresses of microcodes correspondingly stored in microcode storage unit 13. Decoding circuit 11 effects said decoding operation in connection with the example shown in FIG. 2 as follows.

With respect to a machine instruction code "00000110" of the INC instruction, a start address "0000000000" is read. With respect to a machine instruction code "00001001" of the MOV instruction, a start address "0000000011" is read. Further, with respect to a machine instruction code "00001101" of the SHIFT instruction, a start address "0000000000" is read. In addition, with respect to a machine instruction code "00101000" of the ADD instruction, a start address "0000000101" is read. These start addresses are inputs to the microcode storage unit 13, and are subsequently incremented by counter 12.

In the microcode memory area 13b of microcodes storage unit 13, a plurality of microcodes are stored in correspondence with respective microcode addresses designated by the address decoding area 13a. Namely, a microcode represented by "aa . . . a" is stored at address 0000000000, a microcode represented by "bb . . . b" is stored at address 0000000001, a microcode represented by "cc . . . c" is stored at address 0000000010, a microcode represented by "dd . . . d" is stored at address 0000000011, a microcode represented by "ee . . . e" is stored at address 0000000100, a microcode represented by "xx . . . x" is stored at address 0000000101, a microcode represented by "yy . . . y" is stored at address 0000000110, and a microcode represented by "zz . . . z" is stored at address 0000000111.

When the INC instruction is input to the machine instruction decoding circuit 11 as a machine instruction, the address "0000000000" is input to microcode storage unit 13, and microcode represented by "aa . . . a" is output. Subsequently, when counter 12 counts up in synchronism with the clock signal CLK, the microcode of "bb . . . b" corresponding to the next address "0000000011", is output. Likewise, when the counter 12 further counts up, the microcode of "cc . . . c" corresponding to the next address "0000000010" is output. Thus, a microprogram having an output of three steps in respect to the INC instruction is generated.

When the MOV instruction is input to the machine instruction decoding circuit 11, the address "0000000011" is input to microcode storage unit 13, and microcode represented by "dd . . . d" is output. Subsequently, when counter 12 counts up by one in synchronism with clock signal CLE, the microcode "ee . . . e" corresponding to the next address "0000000100" is output. Thus, a microprogram having an output of two steps in respect of the MOV instruction is generated.

The SHIFT instruction is generated identically to the INC instruction. Accordingly, when the SHIFT instruction is input to the machine instruction decoding Circuit 11, the same address "0000000000" as the INC instruction is input to microcode storage unit 13. As previously described, a microprogram output having three steps represented by "aa . . . a", "bb . . . b" and "cc . . . c" is sequentially generated.

When the ADD instruction is input to the machine instruction decoding circuit ii, the address "00000000101" is input to microcode storage unit 13, and microcode represented by "xx . . . x" is output. Subsequently, when the counter 12 counts up by one in synchronism with the clock signal CLK, the microcode "yy . . . y" corresponding to the next address "000000011011" is output. When counter 12 further counts up by one in synchronism with the clock signal CLK, microcode "zz . . . z" corresponding to the next address "0000000111" is output. Thus, a microprogram output having three steps in respect to the ADD instruction is generated.

Where microcodes defining the machine instruction are partially common to each other, the present invention makes possible the generation of microprograms with less memory capacity requirements than conventional devices, and without reducing operating speed, by configuring microcode storage unit 13 in a manner now described.

Referring to FIG. 3, consider a case where machine instructions INSTR1 and INSTR2, each having microprograms of eight steps, have the same microcodes, respectively. Namely, machine instruction INSTR1 has a microprogram having eight microcode steps shown as "aa . . . a", "bb . . . b", "cc . . . c", "dd . . . d", "ee . . . e", "ff . . . f", "gg . . . g" and "hh . . . h", respectively, and machine instruction INSTR2 has a microprogram having eight microcode steps shown as "xx . . . x", "yy . . . y", "zz . . . z", "dd . . . d", cc . . . c", ff . . . f", "gg . . . g" and "hh . . . h".

In conventional microprograms, including common microcodes, are either stored in memory per each machine instruction (FIG. 3A), or a microcode of the fourth step of the microprogram of one machine instruction INSTR1 is used as a jump (FIG. 3B). In the conventional, case shown in FIG. 3A, since common microcodes are also stored for the microprogram per each machine instruction, a large capacity microcode storage unit 103 is required, which is inefficient due to lower operating speed and is uneconomical due to wasted storage area. Further, although the conventional microprogramming system shown in FIG. 3B reduces memory requirements, extra time for the microcomputer is required for the the necessary jump. This jump step results in lower machine execution speed of the microcomputer.

In contrast, as shown in FIG. 3C, this embodiment according to the present invention can provide a function of "don't care" for a certain number of addresses for microcodes common to microprograms of successive machine instructions INSTR1 and INSTR2. The present invention permits microprogramming to be done with reduced memory capacity and without lowering operating speed of the microcomputer.

For example, with respect to machine instruction INSTR1, the microcode "aa . . . a" of the microprogram is stored at an address 0010010000, the microcode "bb . . . b" is stored at an address 0010010001, and the microcode "cc . . . c" is stored at an address 0010010010. With respect to machine instruction INSTR2, the microcode "xx . . . x" of the microprogram is stored at address 0010011000, microcode "yy . . . y" is stored at address 0010011001, and microcode "zz . . . z" is stored at address 0010011010.

Common microcodes of the two microprograms are stored in microcode storage unit 13, with the fourth bit from the lowest or rightmost bit of each address for the common microcodes being a "don't care" bit, which can be arbitrarily defined in its logical state. For example, microcode "dd . . . d" is stored at an address 001001x011 (x represents a bit which undergoes the "don't care" operation), the microcode "ee . . . e" at an address 001001x100, microcode "ff . . . f" at an address 001001x101, microcode "gg . . . g" at an address 001001x110, and microcode "hh . . . h" at an address 001001x111.

Since the fourth from the rightmost bit of each address for the common microcodes is a "don't care" bit, access to common microcodes is possible whether the "don't care" bit represents "0" or "1". Accordingly, for machine instruction INSTR1, it is possible to read out the corresponding microcodes of five bits by initially setting counter 12 to "0010010000", thereafter counter 12 sequentially increments the contents thereof. Further, for machine instruction INSTR2, it is possible to read microcodes represented by "xx . . . ", "yy . . . y", "zz . . . z", "dd . . . d", "ee . . . e", . . . , and "hh . . . h" by initially setting the counter to "0010011000", thereafter counter 12 sequentially increments the contents thereof.

As stated above, this embodiment of the present invention operates with microcodes, thus making it possible to reduce memory requirements of the microcode storage unit 13. Further, since branch operations, for example, jumps, etc., are not needed, execution time of the microcomputer remains constant. In addition, unlike conventional devices, the present invention does not require control memory for the next address of the microprogram.

Figure 4:
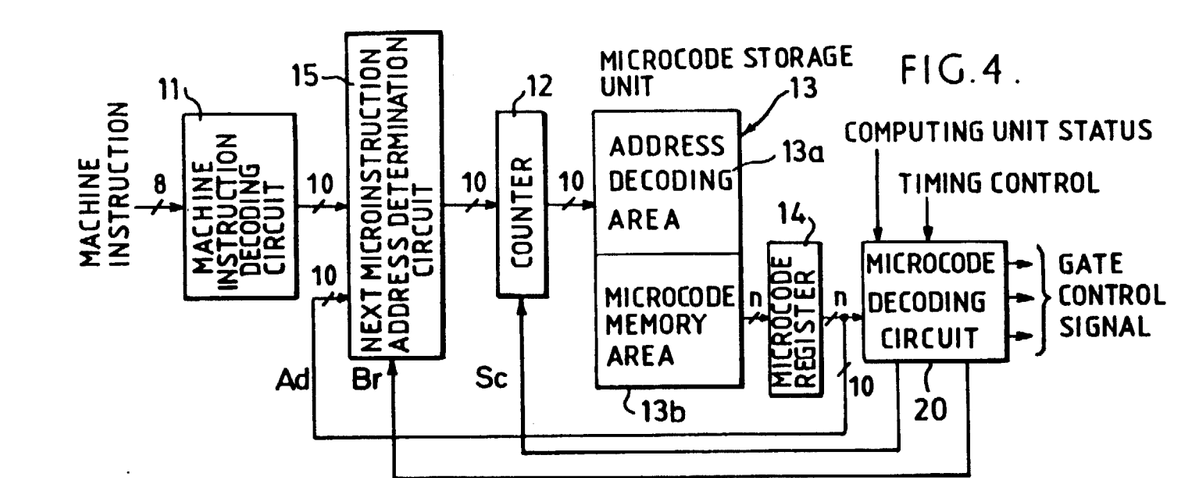
FIG. 4 is a block diagram illustrating another embodiment of a microprogram control device according to the present invention.

Referring now to FIG. 4, there is shown yet another embodiment of a microprogram control device according to the present invention. This embodiment is characterized by a next microinstruction address determination circuit 15 being provided between the machine instruction decoding circuit 11 and the counter 12 and microcode decoding circuit 20 connected to microcode register 14. Next microinstruction address determination circuit 15 is a multiplexer to select either a start address of the microinstruction address from machine instruction decoder 11 or signal Ad (i.e., or a start address of the next microinstruction contained in the microcode), depending upon control signal Br from microcode decoding circuit 20. Control signal Br is output from microcode decoding circuit 20. Control signal Sc, also output from microcode decoding circuit 20, is input to counter 12. The control signals Br and Sc are provided by decoding microcode signals, computing unit status signals and timing control signals which include the machine instruction fetch status. The control signal Sc is used to set the counter with the value from next microinstruction address determination circuit when a new machine instruction is started or a jump microinstruction is executed. Thus, this embodiment designates branch operations used to generate microprograms of various kinds of machine instructions.

The present invention can easily be modified to perform similar functions without being limited to the above-mentioned embodiments. For example, the counter may be provided with an area of high-order bits assigned to a register and a remaining area assigned to the counter itself. In addition, where a plurality of "don't care" bits are provided, it is possible to cope with microcode common to the microprograms of three or more machine instructions.

The foregoing description of the preferred embodiment of the invention has been presented for purposes of illustration and description, and is not intended to be exhaustive or to limit the invention to the precise forms disclosed, since many obvious modifications and variations are possible in light of the above teaching. The embodiments were chosen and described in order best to explain the principles of the invention and its principal application, thereby to enable others skilled in the art best to utilize the invention in various embodiments and with various modifications as are suited to the particular use contemplated. It is intended that the scope of the invention be defined by the claims appended hereto, when interpreted in accordance with the full breadth to which they are fairly and legally entitled.

What is claimed is:

1. A microprogram control device for use with a microcomputer, which comprises:
    (a) machine instruction decoding means for decoding machine instruction codes input from a program memory of the microcomputer to the decoding means to create a microcode start address for each of said machine instruction codes;
    (b) counter means coupled to said machine instruction decoding means for counting in response to the receipt of each of said microcode start addresses, the counting producing a required number of microcode addresses;
    (c) microcode storage means, connected to said counter means, comprising a microcode address decoding area responsive to said microcode addresses from said counter means to designate microcodes corresponding to said microcode addresses, and comprising a microcode memory area in which said microcodes of the micro programs defining said machine instruction codes are stored, wherein when the contents of microcodes defining different bit areas of said machine instruction codes are partially common to each other, said microcode storage means has a function of "don't care" for a certain bit or bits of an address(es) of said common microcode(s); and
    (d) microcode register and decoding means, connected to said microcode storage means, for latching the microcodes read out of said microcode memory area, for outputting said microcodes thus latched to circuit means to be controlled, and for outputting at least a part of said microcodes for controlling said counter means as a control output bit(s) Sc, said control output bit(s) Sc being variable and determined by said microcode register and decoding means, and wherein said counter means, responsive to said control output bit(s) Sc, creates microcode addresses for each microstep of microcode.

2. The microprogram control device of claim 1, which further comprises next microinstruction address determination means connected to said machine instruction decoding means and to said counter means, said next microinstruction address determination means for selecting said microcode start address either from said machine instruction decoding means or from said microcode output from said microcode register and decoding means depending upon a control bit provided to said next microinstruction address determination means, from said microcode register and decoding means.

3. The microprogram control device of claim 1, wherein said counter means has an area of a high-order bit assigned to a register and a remaining area assigned to a counter.

4. The microprogram control device of claim 1, wherein each of said decoding means and said microcode storage means is a programmable logic array or a read only memory.

5. The microprogram control device of claim 1 wherein the decoding means comprises a machine instruction decoding area for designating a microcode start address and a microcode start address area for storing the microcode start addresses.

6. A microprogram control device for use with a microcomputer, which comprises:
  (a) decoding means for decoding machine instruction codes input from a program memory of the microcomputer to the decoding means to create a microcode start address for each of said machine instruction codes;
  (b) counter means, connected to said decoding means, for counting responsive to the receipt of each said microcode start address to produce a required number of microcode addresses;
  (c) microcode storage means, coupled to said counter means, comprising a microcode address decoding area, responsive to said microcode address from said counter means, for designating microcodes corresponding to said microcode addresses and a microcode memory area in which microcodes of microprograms defining said machine instruction codes are stored, at least one microcode of a first instruction code and at least one microcode of a second instruction code being common, said microcode storage means storing a function of "don't care" at a predetermined bit position of said microcode address for said at least one common microcode; and
  (d) microcode register and decode means, connected to said microcode storage means, for latching the microcodes read from said microcode memory area, for outputting said microcodes for controlling circuitry to be controlled, and for outputting at least a part of said microcodes for controlling said counter means as control binary data Sc, said control binary data Sc being variable and determined by said microcode register and decode means, and wherein said counter means, responsive to said control binary data Sc, creates said microcode addresses for each microstep of microcode.

* * * * *